(12) United States Patent
Debnath (10) Patent No.: US 11,985,166 B2
(45) Date of Patent: May 14, 2024

(54) SYSTEMS AND METHODS FOR RANDOM CONNECTIVITY ASSOCIATION KEY NEGOTIATION FOR MEDIA ACCESS CONTROL SECURITY

(71) Applicant: Juniper Networks, Inc., Sunnyvale, CA (US)

(72) Inventor: Nandan Debnath, Bangalore (IN)

(73) Assignee: Juniper Networks, Inc., Sunnyvale, CA (US)

(*) Notice: Subject to any disclaimer, the term of this patent is extended or adjusted under 35 U.S.C. 154(b) by 79 days.

(21) Appl. No.: 17/655,454

(22) Filed: Mar. 18, 2022

(65) Prior Publication Data
US 2023/0300171 A1   Sep. 21, 2023

(51) Int. Cl.
*G06F 21/00* (2013.01)
*H04L 9/40* (2022.01)

(52) U.S. Cl.
CPC .......... *H04L 63/162* (2013.01); *H04L 63/061* (2013.01); *H04L 63/068* (2013.01)

(58) Field of Classification Search
CPC ... H04L 63/162; H04L 63/061; H04L 63/068; H04L 2463/061; H04L 63/12
See application file for complete search history.

(56) References Cited

U.S. PATENT DOCUMENTS

| | | | |
|---|---|---|---|
| 2018/0302269 A1* | 10/2018 | Sankaran | H04L 63/162 |
| 2021/0218717 A1* | 7/2021 | Hill | H04L 9/0822 |
| 2021/0218737 A1 | 7/2021 | Bhagvath | |
| 2022/0070155 A1 | 3/2022 | Gordon et al. | |
| 2023/0308262 A1* | 9/2023 | Majumdar | H04L 9/3242 713/171 |

FOREIGN PATENT DOCUMENTS

CN    101282208 B    4/2011

OTHER PUBLICATIONS

Extended European Search Report for Application No. EP22171595.6, dated Oct. 17, 2022, 9 pages.

* cited by examiner

*Primary Examiner* — Kendall Dolly
(74) *Attorney, Agent, or Firm* — Harrity & Harrity, LLP (57) ABSTRACT

In some implementations, a network device may establish a secure connection between the network device and another network device based on a first set of keys generated by the network device, wherein the first set of keys are generated based on a first connectivity association key (CAK) and the secure connection is established based on a media access control security (MACsec) protocol. The network device may transmit a message to the other network device, wherein the message includes an indication of a second CAK. The network device may communicate data via the secure connection based on a second set of keys, wherein the second set of keys are generated based on the second CAK.

20 Claims, 5 Drawing Sheets

SYSTEMS AND METHODS FOR RANDOM CONNECTIVITY ASSOCIATION KEY NEGOTIATION FOR MEDIA ACCESS CONTROL SECURITY

BACKGROUND

Media access control security (MACsec) is a security protocol that may be utilized to protect data transmitted between two devices. Each device may be configured with the same connectivity association key (CAK) and may utilize the CAK to generate a set of keys. The set of keys may then be utilized to establish a secure communication session between the two devices.

SUMMARY

Some implementations described herein relate to a method. The method may include establishing, by a network device, a secure connection between the network device and another network device based on a first set of keys generated by the network device, wherein the first set of keys are generated based on a first connectivity association key (CAK) and the secure connection is established based on an IEEE Std. 802.1AE media access control security (MACsec) protocol. The method may include transmitting, by the network device, a message to the other network device, wherein the message includes an indication of a second CAK. The method may include communicating, by the network device, data via the secure connection based on a second set of keys, wherein the second set of keys are generated based on the second CAK.

Some implementations described herein relate to a network device. The network device may include one or more memories and one or more processors. The network device may be configured to establish a secure connection between the network device and another network device based on a first set of keys generated by the network device, wherein the first set of keys are generated based on a first CAK and the secure connection is established based on a MACsec protocol. The network device may be configured to transmit a message to the other network device, wherein the message includes an indication of a second CAK. The network device may be configured to communicate data via the secure connection based on a second set of keys, wherein the second set of keys are generated based on the second CAK.

Some implementations described herein relate to a non-transitory computer-readable medium that stores a set of instructions for a network device. The set of instructions, when executed by one or more processors of the network device, may cause the network device to establish a secure connection between the network device and another network device based on a first set of keys generated by the network device, wherein the first set of keys are generated based on a first CAK and the secure connection is established based on a MACsec protocol. The set of instructions, when executed by one or more processors of the network device, may cause the network device to transmit a message to the other network device, wherein the message includes an indication of a second CAK. The set of instructions, when executed by one or more processors of the network device, may cause the network device to communicate data via the secure connection based on a second set of keys, wherein the second set of keys are generated based on the second CAK.

DETAILED DESCRIPTION

The following detailed description of example implementations refers to the accompanying drawings. The same reference numbers in different drawings may identify the same or similar elements.

IEEE Std 802.1AE media access control security (MACsec) is a security protocol that may be deployed to protect data transmitted via a network connection established between two devices. For example, MACsec may be configured on a port of a first device that is physically connected (e.g., via an Ethernet cable) to a port of a second device. The first device and the second device may each be configured with a same static key (e.g., a connectivity association key (CAK)) and may utilize the static key to generate an integrity check key (ICK) and a key exchange key (KEK). The first device (or the second device) may generate a secure association key (SAK) based on the ICK and the KEK. The first device may encrypt the SAK based on the KEK and may provide the encrypted SAK to the second device. The second device may utilize the KEK generated by the second device to decrypt the encrypted SAK. The SAK may then be utilized to encrypt and decrypt data communicated between the first device and the second device.

To provide an increased level of security, the MACsec protocol allows for the SAK to be changed during the established communication session. However, the MACsec protocol does not provide for a change to the CAK. Thus, knowledge of the CAK being utilized may allow an attacker to generate the ICK and the KEK, intercept a communication that includes the encrypted SAK, and utilize the KEK to decrypt the encrypted SAK. The attacker may then intercept and decrypt the encrypted data being transmitted between the first device and the second device.

In some cases, a key chain may be utilized to change the CAK. The key chain may indicate a set of CAKs and a validity period (e.g., a start time and an end time) associated with each CAK. The first device and the second device may identify a validity period that includes the current time and may generate the ICK and the KEK based on the CAK associated with the identified validity period.

However, use of the key chain may require the first device and the second device to be time synchronized and configured with the same key chain. Further, the validity period indicated in each key chain needs to account for differences in time zones that may exist between the first device and the second device. Maintaining the time synchronization and properly configuring the key chains based on a time zone associated with each device may be cumbersome and/or utilize a relatively large amount of computing resources (e.g., processing resources, memory resources, and/or communication resources). Additionally, the number of CAKs that may be included on a key chain may be limited, thereby requiring the first device and the second device to be periodically configured with new key chains upon the expiration of the validity periods indicated for the CAKs.

Some implementations described herein enable a device to negotiate a new CAK during a secure communication session established based on the MACsec protocol. The device may be associated with a key database that includes a plurality of CAKs. Each CAK may be associated with a key name, a key identifier, and a secret (e.g., a data string). In contrast to a key chain, the CAKs may not be associated with a validity period, which may reduce the frequency at which the key database is configured with a new set of CAKs. In some implementations, the device may select a first CAK from the key database, generate a first set of keys (e.g., an ICK, a KEK, and a SAK), and establish a secure communication session with another device based on the first set of keys.

During the secure communication session, to prevent the communication session from being terminated, the devices may periodically (e.g., every two seconds) exchange a MACsec key agreement protocol data unit (MKPDU). The MKPDU may include an indication of the first CAK based on the first set of keys being utilized to establish the secure communication session being established.

In some implementations, the device may determine an occurrence of a key change event, such as an expiration of a time period, a quantity of MKPDUs being transmitted by the device, and/or a quantity of MKPDUs being received from the other device, among other examples. The device may select a new CAK from the key database based on the occurrence of the key change event. The device may randomly select the new CAK or may select the new CAK based on one or more selection criteria (e.g., sequentially based on an order in which the plurality of CAKs are included in the key database).

To change the first CAK to the new CAK, the device may transmit an MKPDU that includes a new CAK identifier (e.g., a particular data string that includes one or more characters or symbols, such as "123", "abcd", a pound sign (#), an ampersand (&), or an asterisk (*), among other examples) followed by an identifier associated with the new CAK. The other device may receive the MKPDU and may determine that the CAK is to be changed based on the MKPDU including the new CAK identifier. The other device may retrieve the new CAK from the key database based on the identifier following the new CAK identifier. The device and the other device may generate a new set of keys based on the new CAK and may utilize the new set of keys to communicate via the secure communication session.

Figure 1:
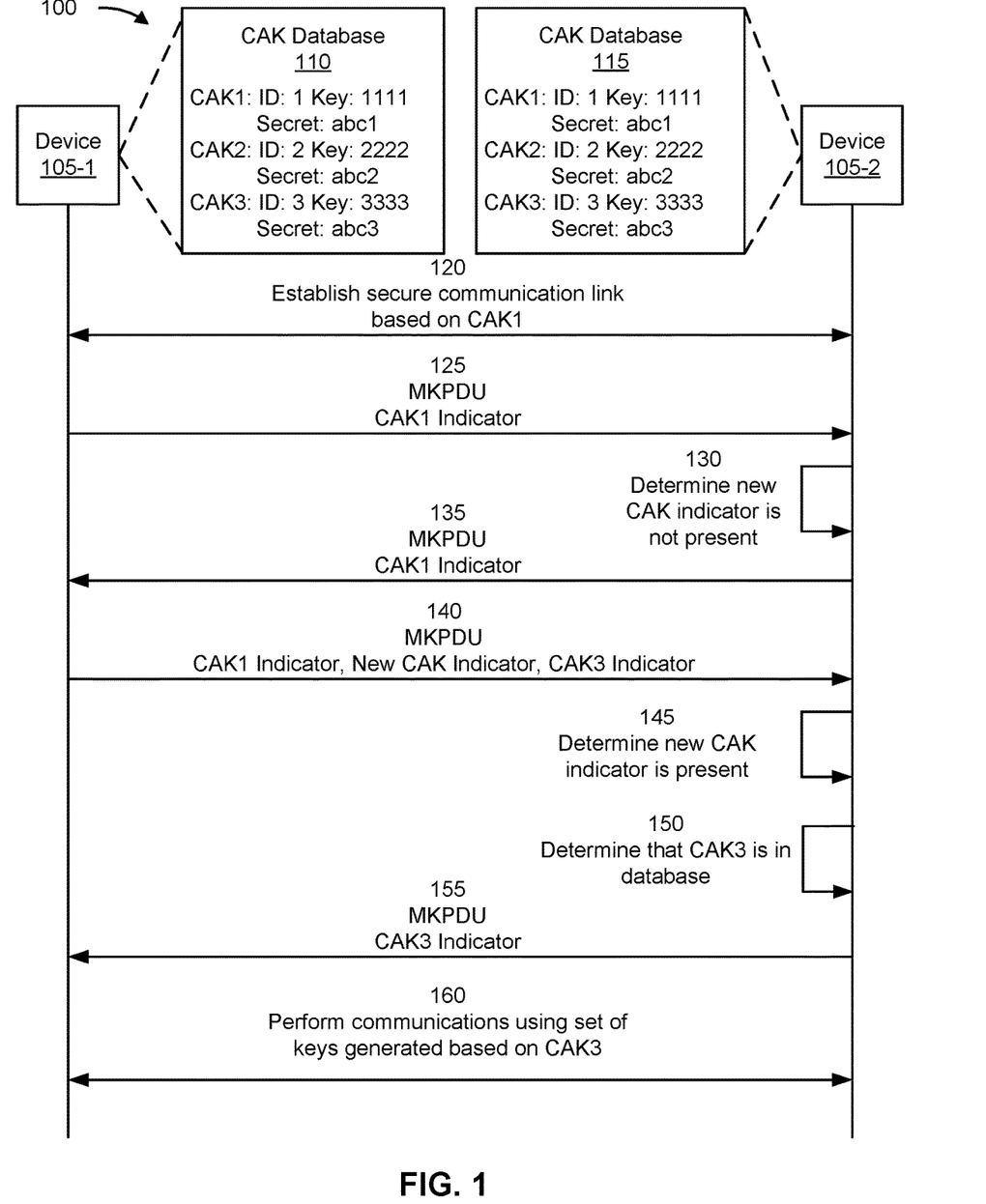
FIGS. 1 and 2 are diagrams of an example implementation described herein.

FIG. 1 is a diagram of an example implementation 100 associated with random CAK negotiation for MACsec. As shown in FIG. 1, example implementation 100 includes a first device 105-1 and a second device 105-2. The first device 105-1 and the second device 105-2 may be connected via a point-to-point connection. For example, a port of the first device 105-1 may be connected by a physical connection (e.g., an Ethernet cable), via another device, or by a shared electronics media to a port of the second device 105-2. The first device 105-1 and the second device 105-2 are described in more detail below in connection with FIG. 3 and FIG. 4.

The first device 105-1 may be associated with a CAK database 110 that includes a plurality of CAKs. For example, as shown in FIG. 1, the CAK database 110 may include a first CAK (e.g., CAK1, as shown), a second CAK (e.g., CAK2, as shown), and a third CAK (e.g., CAK3, as shown). In some implementations, a CAK included in the CAK database 110 may be associated with one or more identifiers. For example, as shown in FIG. 1, each CAK included in the CAK database 110 is associated with a key ID (e.g., ID: 1, as shown for CAK1) and a key name (e.g., key: 1111, as shown for CAK1).

Similarly, the second device 105-2 may be associated with a CAK database 115. As shown in FIG. 1, the CAK database 115 may include a plurality of CAKs corresponding to the plurality of CAKs included in the CAK database 110. In some implementations, each CAK included in the CAK database 110 may be included in the CAK database 115. In some implementations, the CAK database 110 may include one or more CAKs that are not included in the CAK database 115. In some implementations, one or more CAKs that are included in the CAK database 115 may not be included in the CAK database 110.

As shown by reference number 120, the first device 105-1 and the second device 105-2 may establish a secure communication link based on a CAK included in the CAK database 110 and the CAK database 115. Each CAK included in the CAK database 110 may be associated with a CAK name (e.g., CAK1, CAK2, and CAK3, as shown in FIG. 1) and/or a key identifier (e.g., 1, 2, and 3, as shown in FIG. 1). Each CAK name and/or key identifier may identify a unique combination of a key and a secret. For example, as shown in FIG. 1, CAK1 identifies key 1111 and secret abc1.

To establish a secure connection, the first device 105-1 and the second device 105-2 should utilize a same CAK name and/or a same key identifier and the key and secret identified by the CAK name. In some implementations, the first device 105-1 and the second device 105-2 may establish the secure communication link based on a MACsec key agreement (MKA) protocol. The MKA protocol may define a procedure for negotiating a CAK and exchanging keys generated based on the CAK and utilized to establish the secure communication session.

In some implementations, the first device 105-1 and the second device 105-2 may perform a key server election process to identify the device (e.g., the first device 105-1 or the second device 105-2) that will act as the key server for the communication session. The key server may generate and distribute the SAK, as described in greater detail elsewhere herein.

In some implementations, the key server may be determined based on a priority associated with the first device 105-1 and a priority associated with the second device 105-2. For example, the first device 105-1 may be associated with a first priority and the second device 105-2 may be associated with a second priority. The first priority may be a higher priority relative to the second priority. The first device 105-1 may serve as the key server based on the first device 105-1 being associated with the higher priority relative to the second device 105-2.

Additionally, or alternatively, the key server may be determined based on one or more criteria. For example, the key server may be determined based on a MAC address (e.g., the device having the lowest MAC address or the device having the highest MAC address), a time at which each device was connected to a network (e.g., the device connected prior to the other device being connected or the device connected after the other device was connected), and/or a device that sends an initial message associated with establishing the communication session, among other examples.

In some implementations, the first device 105-1 may select a first CAK (e.g., CAK1) from the CAK database 110 based on being designated the key server. The first device 105-1 may utilize a pre-configured algorithm (e.g., an algorithm defined by a standard or an algorithm configured by an administrator, among other examples) to generate a set of keys based on the first CAK. In some implementations, the set of keys may include an ICK, a KEK, and a SAK that is generated based on the ICK and the KEK.

In some implementations, the first device 105-1 may provide a key information message to the second device 105-2 based on selecting the first CAK from the CAK database 110 and/or generating the set of keys. In some implementations, the key information message may include an MKPDU. The key information may include an indication of the selected CAK (e.g., the key identifier or the key name associated with the first CAK) and the SAK. The SAK may be encrypted based on the KEK.

The second device 105-2 may receive the key information message from the first device 105-1. The second device 105-2 may determine that the first CAK corresponds to the CAK selected by the first device 105-1 based on the indication of the selected CAK included in the key information message. The second device 105-2 may retrieve the first CAK from the CAK database 115 based on the first CAK corresponding to the selected CAK.

In some implementations, the second device 105-2 may be configured with the same pre-configured algorithm utilized by the first device 105-1 to generate the set of keys. The second device 105-2 may utilize the pre-configured algorithm to generate a set of keys based on the first CAK. The set of keys generated by the second device 105-2 may include an ICK and a KEK that correspond to the ICK and the KEK generated by the first device 105-1. The second device 105-2 may utilize the KEK to decrypt the SAK included in the key information message. The second device 105-2 may utilize the decrypted SAK to encrypt data transmitted to the first device 105-1 and to decrypt data received from the first device 105-1.

In some implementations, the second device 105-2 may provide a message to the first device 105-1 based on successfully decrypting the encrypted SAK. For example, the second device 105-2 may transmit an MKPDU to the first device 105-1. The MKPDU may include an indication (e.g., a key identifier or a key name) associated with the first CAK. In some implementations, the secure communication may be established based on the first device 105-1 receiving the MKPDU and/or based on the MKPDU including the indication associated with the first CAK.

As shown by reference number 125, the first device 105-1 may transmit an MKPDU to the second device 105-2. The first device 105-1 may periodically (e.g., every 1 second or every 2 seconds, among other examples) transmit an MKPDU to the second device 105-2 as a keep alive mechanism. For example, the first device 105-1 may periodically transmit the MKPDU to the second device 105-2 and determine if an MKPDU is received from the second device 105-2 in response. If an MKPDU is not received from the second device 105-2 within a configured time period, the first device 105-1 may terminate the communication session. Additionally, or alternatively, if the second device 105-2 does not receive an MKPDU from the first device 105-1 within the time period, the second device 105-2 may terminate the communication session.

In some implementations, the MKPDU may include a key name parameter. The key name parameter may indicate the current CAK (e.g., the first CAK). The indication may include the key name associated with the first CAK. The key name parameter may include a string of data (e.g., a hex string) corresponding to the key name associated with the current CAK. In some implementations, a length of the key name parameter may be an integral quantity of octets (e.g., a multiple of four octets). In some implementations, when a length of the string of data corresponding to the key name is less than an integral quantity of octets, the key name parameter may include a quantity of padding appended to the end of the string of data to cause the length of the string of data to be an integral quantity of octets.

The second device 105-2 may receive the MKPDU from the first device 105-1. The second device 105-2 may identify the key name parameter included in the MKPDU and may determine whether the key name parameter includes a new CAK indicator. As shown by reference number 130, the second device 105-2 may determine that the new CAK indicator is not included in the key name parameter. The second device 105-2 may determine that the CAK is not to be changed based on the new CAK indicator not being included in the key name parameter (e.g., the second device 105-2 may continue utilizing the set of keys generated based on the current CAK for the secure communication session).

As shown by reference number 135, the second device 105-2 may transmit an MKPDU that includes the indication of the current CAK to the first device 105-1. The second device 105-2 may transmit the MKPDU to the first device 105-1 based on receiving the MKPDU from the first device 105-1. The MKPDU may include the indication of the current CAK based on the second device 105-2 determining that the CAK is not to be changed.

In some implementations, the first device 105-1 may determine an occurrence of a change CAK event. In some implementations, the occurrence of the change CAK event may correspond to an expiration of a time period. For example, the first device 105-1 may initiate a timer based on successfully negotiating the CAK and/or establishing the secure communication session. The timer may be set to an initial value. In some implementations, the initial value may be a pre-configured value. In some implementations, the initial value may be randomly selected by the first device 105-1.

The first device 105-1 may periodically (e.g., every second) cause the value of the timer to be decremented. The first device 105-1 may determine the occurrence of the change CAK event based on the value of the timer being equal to zero. The first device 105-1 may determine to cause the current CAK to be changed to a new CAK based on the occurrence of the change CAK event.

The first device 105-1 may select a new CAK (e.g., CAK3, as shown in FIG. 1) from the CAK database 110. In some implementations, the first device 105-1 may randomly select the new CAK from the CAK database 110. In some implementations, the first device 105-1 may select the new CAK based on one or more selection criteria. For example, the first device 105-1 may determine a CAK, of the plurality of CAKs, associated with a key identifier corresponding to a highest value, a lowest value, or a value closest to a value corresponding to the key identifier associated with the current CAK, among other examples, relative to the key identifiers associated with the other CAKs of the plurality of CAKs.

As shown by reference number 140, the first device 105-1 may transmit an MKPDU to the second device 105-2. The MKPDU may be a next MKPDU, of the periodic MKPDUs transmitted by the first device 105-1 to the second device 105-2. The MKPDU may include an indication of the current CAK (e.g., the first CAK), a new CAK indicator, and an indication of the new CAK (e.g., CAK3, as shown in FIG. 1).

In some implementations, the MKPDU may include a key name parameter that includes the indication of the current CAK, the new CAK indicator, and/or the indication of the new CAK. The new CAK indicator may include a particular data string. For example, the new CAK indicator may include a string of one or more predetermined letters, characters, and/or numbers. In some implementations, the new CAK indicator may include a predetermined character, such as a pound sign (#), a dollar sign ($), an asterisk (*), or an ampersand (@), among other examples.

In some implementations, the indication of the new CAK may immediately follow the new CAK indicator. The indication of the new CAK may include the key identifier associated with the new CAK (e.g., ID: 3, as shown in FIG. 1), the key name associated with the new CAK (e.g., Key: 3333, as shown in FIG. 1), and/or other data that uniquely identifies the new CAK.

In some implementations, the new CAK indicator and the indication of the new CAK may be appended to an end of the indication of the current CAK. For example, the indication of the current CAK may include a key name associated with the current CAK and a quantity of padding. The new CAK indicator and the indication of the new CAK may replace some or all of the quantity of padding.

In some implementations, the quantity of padding may not be sufficient. For example, a length of the new CAK indicator and the indication of the new CAK may be greater than the quantity of padding, or the key name parameter may not include padding. In these implementations, the new CAK indicator and the indication of the new CAK may replace a portion (or all) of the indication of the current CAK.

The second device 105-2 may receive the MKPDU from the first device 105-1. As shown by reference number 145, the second device 105-2 may determine that the new CAK indicator is included in the MKPDU. The second device 105-2 may identify a data string immediately following the new CAK indicator. The second device 105-2 may determine that the identified data string corresponds to an indicator associated with a new CAK (e.g., a key identifier and/or a key name associated with the new CAK) based on the data string following the new CAK indicator.

The second device 105-2 may determine whether the new CAK is included in the CAK database 115 based on the indicator associated with the new CAK. In some implementations, the second device 105-2 may determine that the new CAK is not included in the CAK database 115 and the second device 105-2 may perform one or more actions, as described below with respect to FIG. 2.

In some implementations, as shown by reference number 150, the second device 105-2 may determine that the new CAK is included in the CAK database 115. The first device 105-1 may generate an MKPDU that includes an indication of the new CAK (rather than the indication of the previous CAK (e.g., CAK1)). As shown by reference number 155, the second device 105-2 may transmit the MKPDU, including the indication of the new CAK (e.g., CAK3, as shown) to the first device 105-1.

As shown by reference number 160, the first device 105-1 and the second device 105-2 may perform communications using a set of keys generated based on the new CAK. In some implementations, the first device 105-1 and the second device 105-2 may generate the set of keys and perform the communications based on the new CAK in a manner similar to that described above with respect to the previous CAK.

As indicated above, FIG. 1 is provided as an example. Other examples may differ from what is described with regard to FIG. 1. The number and arrangement of devices shown in FIG. 1 are provided as an example. In practice, there may be additional devices, fewer devices, different devices, or differently arranged devices than those shown in FIG. 1. Furthermore, two or more devices shown in FIG. 1 may be implemented within a single device, or a single device shown in FIG. 1 may be implemented as multiple, distributed devices. Additionally, or alternatively, a set of devices (e.g., one or more devices) shown in FIG. 1 may perform one or more functions described as being performed by another set of devices shown in FIG. 1.

Figure 2:
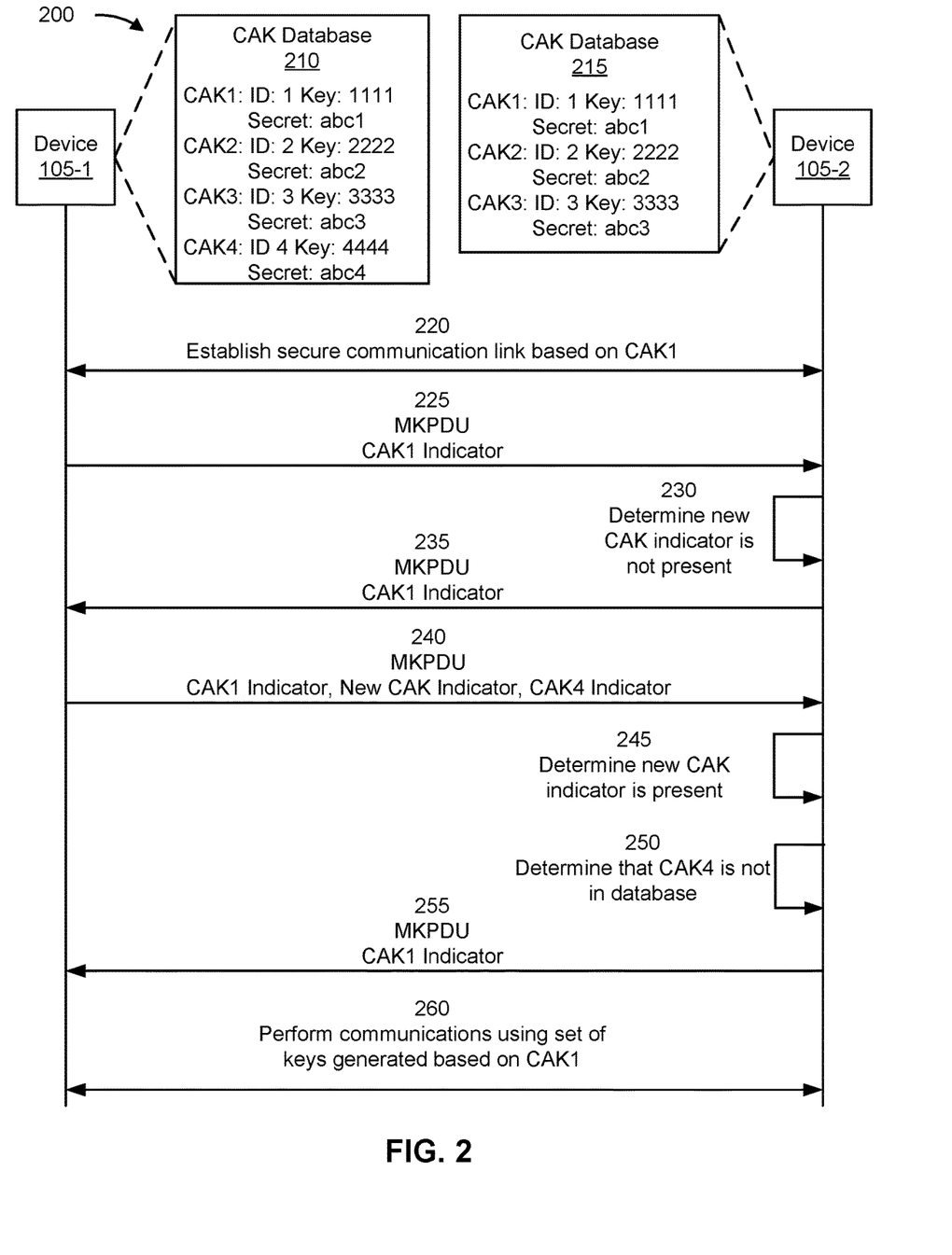

FIG. 2 is a diagram of an example implementation 200 associated with random CAK negotiation for MACsec. As shown in FIG. 2, example implementation 200 includes a first device 105-1 and a second device 105-2. The first device 105-1 and the second device 105-2 may be connected via a point-to-point connection. For example, a port of the first device 105-1 may be connected by a physical connection (e.g., an Ethernet cable) to a port of the second device 105-2. The first device 105-1 and the second device 105-2 are described in more detail below in connection with FIG. 3 and FIG. 4.

The first device 105-1 may be associated with a CAK database 210 that includes a plurality of CAKs. For example, as shown in FIG. 2, the CAK database 210 may include a first CAK (e.g., CAK1, as shown), a second CAK (e.g., CAK2, as shown), a third CAK (e.g., CAK3, as shown), and a fourth CAK (e.g., CAK4, as shown). In some implementations, a CAK included in the CAK database 210 may be associated with one or more identifiers. For example, as shown in FIG. 2, each CAK included in the CAK database 210 is associated with a key ID (e.g., ID: 1, as shown for CAK1) and a key name (e.g., key: 1111, as shown for CAK1).

Similarly, the second device 105-2 may be associated with a CAK database 215. In some implementations, each CAK included in the CAK database 210 may be included in the CAK database 215. In some implementations, the CAK database 210 may include one or more CAKs that are not included in the CAK database 215. In some implementations, one or more CAKs that are included in the CAK database 215 may not be included in the CAK database 210. As shown in FIG. 2, the CAK database 215 may include a plurality of CAKs corresponding to a portion of the plurality of CAKs included in the CAK database 210 (e.g., the CAK database 215 does not include the fourth CAK).

As shown by reference number 220, the first device 105-1 and the second device 105-2 may establish a secure communication link based on a CAK included in the CAK database 210 and the CAK database 215. In some implementations, the first device 105-1 and the second device 105-2 may establish the secure communication link based on a MACsec key agreement (MKA) protocol. The MKA protocol may define a procedure for negotiating and exchanging keys utilized to establish the secure communication session.

In some implementations, the first device 105-1 and the second device 105-2 may perform a key server election process to identify the device (e.g., the first device 105-1 or the second device 105-2) that will act as the key server for the communication session. The key server may generate and distribute the SAK, as described in greater detail elsewhere herein. In some implementations, the first device 105-1 and the second device 105-2 may perform the key server election process to identify the first device 105-1 as the key server in a manner similar to that described above with respect to FIG. 1.

In some implementations, the first device 105-1 may select a first CAK (e.g., CAK1) from the CAK database 210 based on being designated the key server. The first device 105-1 may utilize a pre-configured algorithm (e.g., an algorithm defined by a standard or an algorithm configured by an administrator, among other examples) to generate a set of keys based on the first CAK. In some implementations, the set of keys may include an ICK, a KEK, and a SAK that is generated based on the ICK and the KEK.

In some implementations, the first device 105-1 may provide a key information message to the second device 105-2 based on selecting the first CAK from the CAK database 110 and/or generating the set of keys. In some implementations, the key information message may include an MKPDU. The key information may include an indication of the selected CAK (e.g., the key identifier or the key name associated with the first CAK) and the SAK. The SAK may be encrypted based on the KEK.

The second device 105-2 may receive the key information message from the first device 105-1. The second device 105-2 may determine that the first CAK corresponds to the CAK selected by the first device 105-1 based on the indication of the selected CAK included in the key information message. The second device 105-2 may retrieve the first CAK from the CAK database 215 based on the first CAK corresponding to the selected CAK.

In some implementations, the second device 105-2 may be configured with the same pre-configured algorithm utilized by the first device 105-1 to generate the set of keys. The second device 105-2 may utilize the pre-configured algorithm to generate a set of keys based on the first CAK. The set of keys generated by the second device 105-2 may include an ICK and a KEK that correspond to the ICK and the KEK generated by the first device 105-1. The second device 105-2 may utilize the KEK to decrypt the SAK included in the key information message. The second device 105-2 may utilize the decrypted SAK to encrypt data transmitted to the first device 105-1 and to decrypt data received from the first device 105-1.

In some implementations, the second device 105-2 may provide a message to the first device 105-1 based on successfully decrypting the encrypted SAK. For example, the second device 105-2 may transmit an MKPDU to the first device 105-1. The MKPDU may include an indication (e.g., a key identifier or a key name) associated with the first CAK. In some implementations, the secure communication may be established based on the first device 105-1 receiving the MKPDU and/or based on the MKPDU including the indication associated with the first CAK.

As shown by reference number 225, the first device 105-1 may transmit an MKPDU to the second device 105-2. The first device 105-1 may periodically (e.g., every 1 second or every 2 seconds, among other examples) transmit an MKPDU to the second device 105-2 as a keep alive mechanism. For example, the first device 105-1 may periodically transmit the MKPDU to the second device 105-2 and determine if an MKPDU is received from the second device 105-2 in response. If an MKPDU is not received from the second device 105-2 within a time period, the first device 105-1 may terminate the communication session. Additionally, or alternatively, if the second device 105-2 does not receive an MKPDU from the first device 105-1 within the time period, the second device 105-2 may terminate the communication session.

In some implementations, the MKPDU may include a key name parameter. The key name parameter may indicate the current CAK (e.g., the first CAK). The indication may include the key name associated with the first CAK. The key name parameter may include a string of data (e.g., a hex string) corresponding to the key name associated with the current CAK. In some implementations, a length of the key name parameter may be an integral quantity of octets (e.g., a multiple of four octets). In some implementations, when a length of the string of data corresponding to the key name is less than an integral quantity of octets, the key name parameter may include a quantity of padding appended to the end of the string of data to cause the length of the string of data to be an integral quantity of octets.

The second device 105-2 may receive the MKPDU from the first device 105-1. The second device 105-2 may identify the key name parameter included in the MKPDU and may determine whether the key name parameter includes a new CAK indicator. As shown by reference number 230, the second device 105-2 may determine that the new CAK indicator is not included in the key name parameter. The second device 105-2 may determine that the CAK is not to be changed based on the new CAK indicator not being included in the key name parameter (e.g., the second device 105-2 may continue utilizing the set of keys generated based on the current CAK for the secure communication session).

As shown by reference number 235, the second device 105-2 may transmit an MKPDU that includes the indication of the current CAK to the first device 105-1. The second device 105-2 may transmit the MKPDU to the first device 105-1 based on receiving the MKPDU from the first device 105-1. The MKPDU may include the indication of the current CAK based on the second device 105-2 determining that the CAK is not to be changed.

In some implementations, the second device 105-2 may determine to change the CAK. In some implementations, the second device 105-2 may determine to change the CAK based on an occurrence of a change CAK event, as described in greater detail below. In these implementations, the second device 105-2 may select a new CAK from the CAK database 215 and the MKPDU transmitted by the second device 105-2 to the first device 105-1 may include the indication of the current CAK, a new CAK indicator, and an indication of the new CAK selected by the second device 105-2, as described in greater detail elsewhere herein.

In some implementations, the first device 105-1 may determine an occurrence of a change CAK event. In some implementations, the occurrence of the change CAK event may correspond to an expiration of a time period. For example, the first device 105-1 may initiate a timer based on successfully negotiating the CAK and/or establishing the secure communication session. The timer may be set to an initial value. In some implementations, the initial value may be a pre-configured value. In some implementations, the initial value may be randomly selected by the first device 105-1.

The first device 105-1 may periodically (e.g., every second) cause the value of the timer to be decremented. The first device 105-1 may determine the occurrence of the change CAK event based on the value of the timer being equal to zero. The first device 105-1 may determine to cause the current CAK to be changed to a new CAK based on the occurrence of the change CAK event.

The first device 105-1 may select a new CAK (e.g., CAK4, as shown in FIG. 2) from the CAK database 210. In some implementations, the first device 105-1 may randomly select the new CAK from the CAK database 210. In some implementations, the first device 105-1 may select the new CAK based on one or more selection criteria. For example, the first device 105-1 may determine a CAK, of the plurality of CAKs, associated with a key identifier corresponding to a highest value, a lowest value, or a value closest to a value corresponding to the key identifier associated with the current CAK, among other examples, relative to the key identifiers associated with the other CAKs of the plurality of CAKs.

As shown by reference number 240, the first device 105-1 may transmit an MKPDU to the second device 105-2. The MKPDU may be a next MKPDU, of the periodic MKPDUs transmitted by the first device 105-1 to the second device 105-2. The MKPDU may include an indication of the current CAK (e.g., the first CAK), a new CAK indicator, and an indication of the new CAK (e.g., CAK4, as shown in FIG. 2).

In some implementations, the MKPDU may include a key name parameter that includes the indication of the current CAK, the new CAK indicator, and/or the indication of the new CAK. The new CAK indicator may include a particular data string. For example, the new CAK indicator may include a string of one or more predetermined letters, characters, and/or numbers. In some implementations, the new CAK indicator may include a predetermined character, such as a pound sign (#), a dollar sign ($), an asterisk (*), or an ampersand (@), among other examples.

In some implementations, the indication of the new CAK may immediately follow the new CAK indicator. The indication of the new CAK may include the key identifier associated with the new CAK (e.g., ID: 4, as shown in FIG. 2), the key name associated with the new CAK (e.g., Key: 4444, as shown in FIG. 2), and/or other data that uniquely identifies the new CAK.

In some implementations, the new CAK indicator and the indication of the new CAK may be appended to an end of the indication of the current CAK. For example, the indication of the current CAK may include a key name associated with the current CAK and a quantity of padding. The new CAK indicator and the indication of the new CAK may replace some or all of the quantity of padding.

In some implementations, the quantity of padding may not be sufficient. For example, a length of the new CAK indicator and the indication of the new CAK may be greater than the quantity of padding, or the key name parameter may not include padding. In these implementations, the new CAK indicator and the indication of the new CAK may replace a portion (or all) of the indication of the current CAK.

The second device 105-2 may receive the MKPDU from the first device 105-1. As shown by reference number 245, the second device 105-2 may determine that the new CAK indicator is included in the MKPDU. The second device 105-2 may identify a data string immediately following the new CAK indicator. The second device 105-2 may determine that the identified data string corresponds to an indicator associated with a new CAK (e.g., a key identifier and/or a key name associated with the new CAK) based on the data string following the new CAK indicator.

The second device 105-2 may determine whether the new CAK is included in the CAK database 215 based on the indicator associated with the new CAK. In some implementations, the second device 105-2 may determine that the new CAK is included in the CAK database 215 and the second device 105-2 may perform one or more actions, as described above with respect to FIG. 1.

In some implementations, as shown by reference number 250, the second device 105-2 may determine that the new CAK is not included in the CAK database 215. The first device 105-1 may generate an MKPDU that includes an indication of the current CAK (rather than the indication of the new CAK (e.g., CAK4)). In this way, the second device 105-2 may indicate to the first device 105-1 that the second device 105-2 is unable to utilize the new CAK selected by the first device 105-1. As shown by reference number 255, the second device 105-2 may transmit the MKPDU, including the indication of the current CAK (e.g., CAK1, as shown) to the first device 105-1.

In some implementations, the second device 105-2 may select a new CAK from the CAK database 215 based on the new CAK selected by the first device 105-1 not being included in the CAK database 215. In these implementations, the MKPDU transmitted by the second device 105-2 to the first device 105-1 may include the indication of the current CAK, a new CAK indicator, and an indication of the new CAK selected by the second device 105-2, as described in greater detail elsewhere herein.

In some implementations, the first device 105-1 may receive the MKPDU and may determine that the MKPDU does not include the indication of the new CAK selected by the first device 105-1 and/or that the MKPDU includes an indication of the current CAK (e.g., CAK1). In some implementations, the first device 105-1 may attempt to change the CAK to the new CAK a quantity of times (e.g., two, three, or four, among other examples). For example, the first device 105-1 may transmit another MKPDU that includes an indication of the current CAK, the new CAK indicator, and an indication of the new CAK based on the MKPDU received from the second device 105-2.

In some implementations, the first device 105-1 may continue to transmit an MKPDU that includes an indication of the current CAK, the new CAK indicator, and an indication of the new CAK until the first device 105-1 receives an MKPDU that includes an indication of the new CAK from the second device 105-2. In some implementations, the first device 105-1 may continue to transmit an MKPDU that includes an indication of the current CAK, the new CAK indicator, and an indication of the new CAK until a particular quantity of MKPDUs have been transmitted to the second device 105-2.

In some implementations, the first device 105-1 may select another new CAK from the CAK database 210 based on determining that the MKPDU received from the second device 105-2 does not include the indication of the new CAK and/or that the MKPDU includes an indication of the current CAK (e.g., CAK1). The first device 105-1 may transmit an MKPDU that includes an indication of the current CAK, the new CAK indicator, and an indication of the newly selected CAK to the second device 105-2 to attempt to change the current CAK to the newly selected CAK.

In some implementations, the MKPDU received from the second device 105-2 may include the new CAK indicator and the indication of the new CAK selected by the second device 105-2. The first device 105-1 may determine whether the new CAK selected by the second device 105-2 is included in the CAK database 210. When the new CAK selected by the second device 105-2 is included in the CAK database 210, the first device 105-1 may transmit an MKPDU that includes the indication of the new CAK selected by the second device 105-2 and may utilize the new CAK selected by the second device 105-2 for the communication session in a manner similar to that described elsewhere herein.

In some implementations, the first device 105-1 may determine to continue to utilize the set of keys generated based on the current CAK (e.g., CAK1) based on determining that the MKPDU received from the second device 105-2 does not include the indication of the new CAK and/or that the MKPDU includes an indication of the current CAK (e.g., CAK1). As shown by reference number 260, the first device 105-1 and the second device 105-2 may continue performing communications using the set of keys generated based on the current CAK (e.g., CAK1).

As indicated above, FIG. 2 is provided as an example. Other examples may differ from what is described with regard to FIG. 2. The number and arrangement of devices shown in FIG. 2 are provided as an example. In practice, there may be additional devices, fewer devices, different devices, or differently arranged devices than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) shown in FIG. 2 may perform one or more functions described as being performed by another set of devices shown in FIG. 2.

Figure 3:
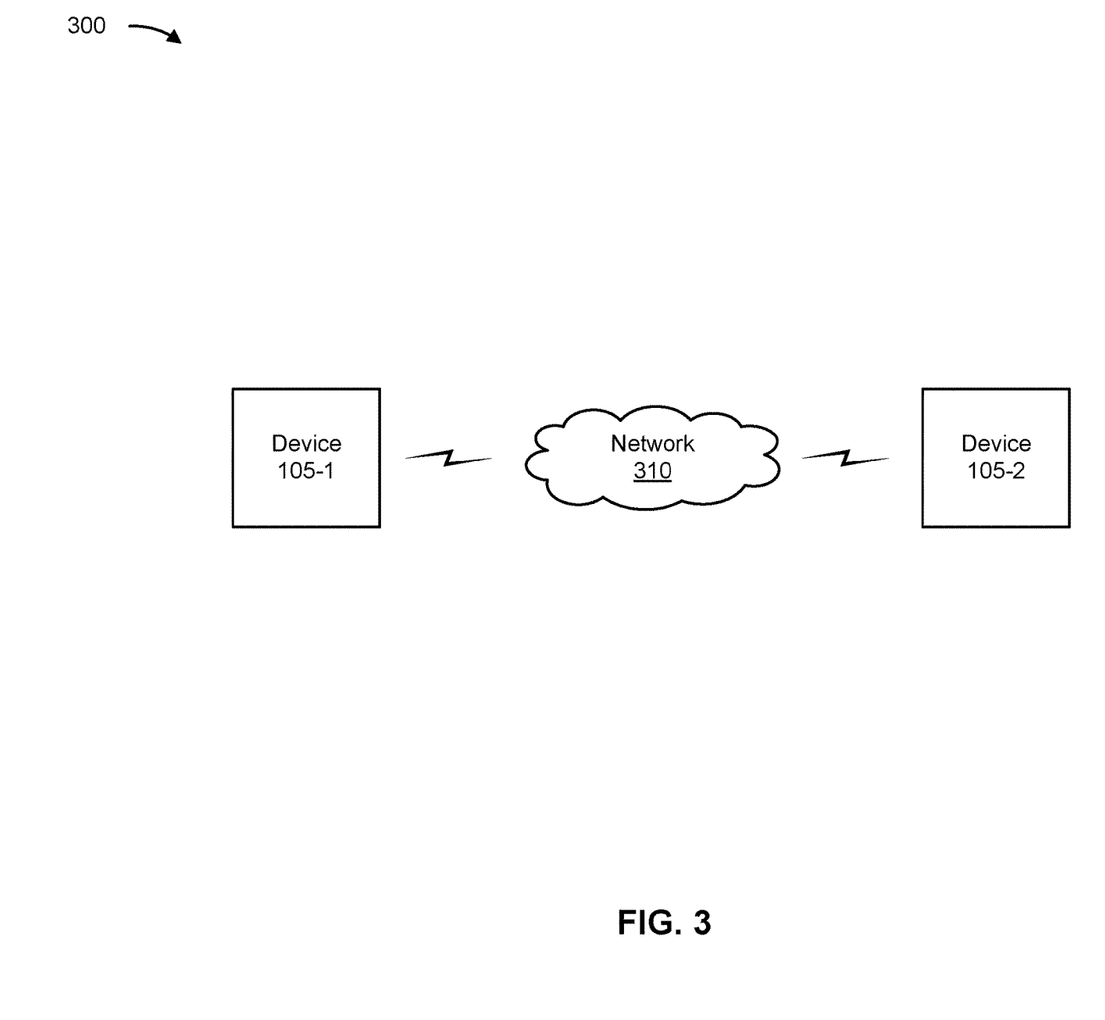
FIG. 3 is a diagram of an example environment in which systems and/or methods described herein may be implemented.

FIG. 3 is a diagram of an example environment 300 in which systems and/or methods described herein may be implemented. As shown in FIG. 3, environment 300 may include a pair of devices 105 (e.g., a device 105-1 and a device 105-2, as shown) and a network 310. Devices of environment 300 may interconnect via wired connections, wireless connections, or a combination of wired and wireless connections.

In some implementations, the device 105 may include a user device 105. The user device may include one or more devices capable of receiving, generating, storing, processing, and/or providing information associated with random CAK negotiation for MACsec, as described elsewhere herein. The user device may include a communication device and/or a computing device. For example, the user device may include a wireless communication device, a mobile phone, a user equipment, a laptop computer, a tablet computer, a desktop computer, a gaming console, a set-top box, a wearable communication device (e.g., a smart wristwatch, a pair of smart eyeglasses, a head mounted display, or a virtual reality headset), or a similar type of device.

In some implementations, the device 105 may include a server device. The server device may include one or more devices capable of receiving, generating, storing, processing, providing, and/or routing information associated with random CAK negotiation for MACsec, as described elsewhere herein. The server device may include a communication device and/or a computing device. For example, the server device 105 may include a server, such as an application server, a client server, a web server, a database server, a host server, a proxy server, a virtual server (e.g., executing on computing hardware), or a server in a cloud computing system. In some implementations, the server device 105 includes computing hardware used in a cloud computing environment.

In some implementations, the device 105 may include a network device. The network device may include one or more devices capable of receiving, processing, storing, routing, and/or providing traffic (e.g., a packet and/or other information or metadata) in a manner described herein. For example, the network device may include a router, such as a label switching router (LSR), a label edge router (LER), an ingress router, an egress router, a provider router (e.g., a provider edge router or a provider core router), a virtual router, or another type of router. Additionally, or alternatively, the network device may include a gateway, a switch, a firewall, a hub, a bridge, a reverse proxy, a server (e.g., a proxy server, a cloud server, or a data center server), a load balancer, and/or a similar device. In some implementations, the network device may be a physical device implemented within a housing, such as a chassis. In some implementations, the network device may be a virtual device implemented by one or more computing devices of a cloud computing environment or a data center. In some implementations, a group of network devices may be a group of data center nodes that are used to route traffic flow through a network.

The network 310 may include one or more wired and/or wireless networks. For example, the network 310 may include a wireless wide area network (e.g., a cellular network or a public land mobile network), a local area network (e.g., a wired local area network or a wireless local area network (WLAN), such as a Wi-Fi network), a personal area network (e.g., a Bluetooth network), a near-field communication network, a telephone network, a private network, the Internet, and/or a combination of these or other types of networks. The network 310 enables communication among the devices of environment 300.

The number and arrangement of devices and networks shown in FIG. 3 are provided as an example. In practice, there may be additional devices and/or networks, fewer devices and/or networks, different devices and/or networks, or differently arranged devices and/or networks than those shown in FIG. 3. Furthermore, two or more devices shown in FIG. 3 may be implemented within a single device, or a single device shown in FIG. 3 may be implemented as multiple, distributed devices. Additionally, or alternatively, a set of devices (e.g., one or more devices) of environment 300 may perform one or more functions described as being performed by another set of devices of environment 300.

Figure 4:
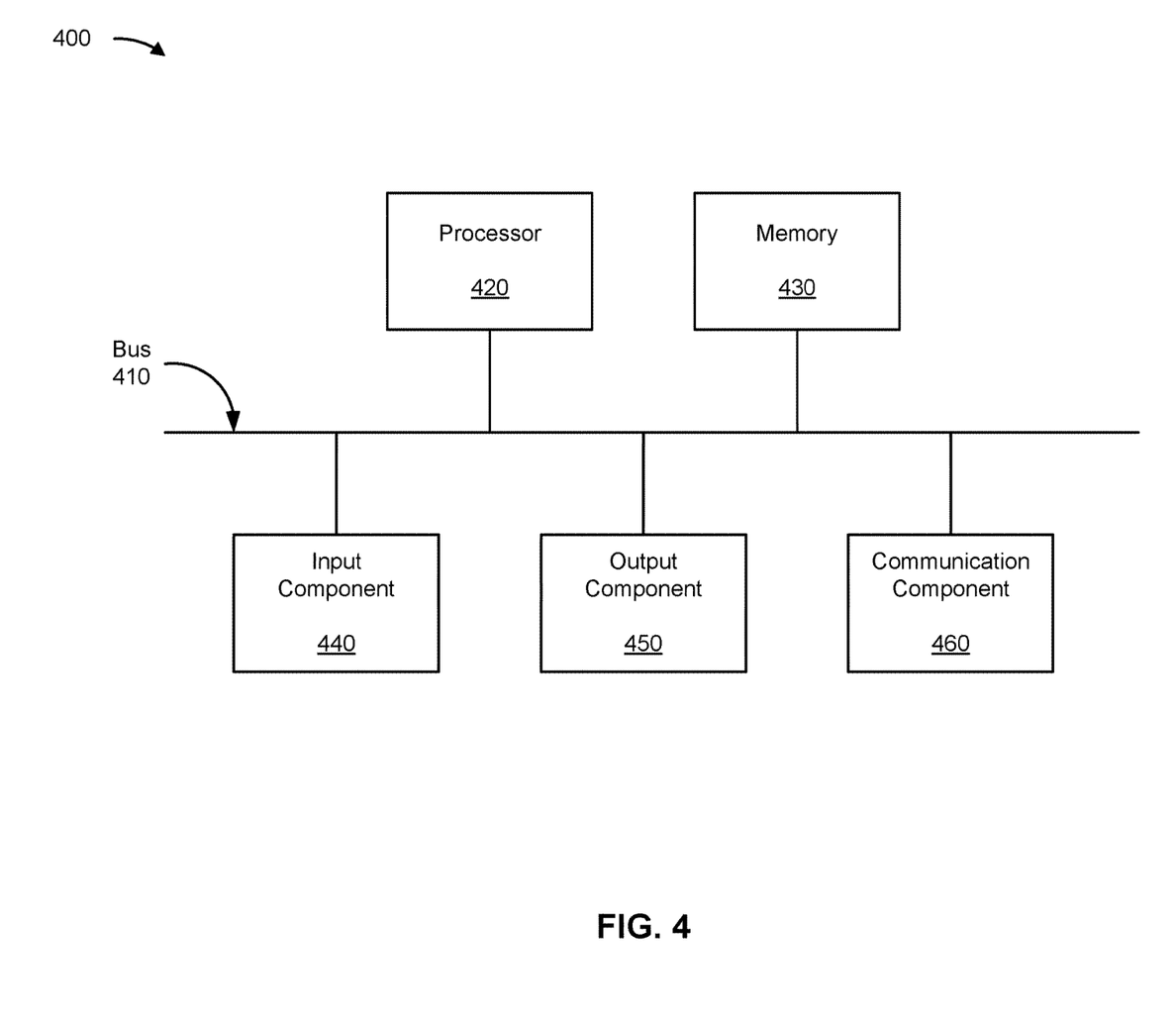
FIG. 4 is a diagram of example components of one or more devices of FIG. 3.

FIG. 4 is a diagram of example components of a device 400, which may correspond to the device 105. In some implementations, the device 105 include one or more devices 400 and/or one or more components of device 400. As shown in FIG. 4, device 400 may include a bus 410, a processor 420, a memory 430, an input component 440, an output component 450, and a communication component 460.

Bus 410 includes one or more components that enable wired and/or wireless communication among the components of device 400. Bus 410 may couple together two or more components of FIG. 4, such as via operative coupling, communicative coupling, electronic coupling, and/or electric coupling. Processor 420 includes a central processing unit, a graphics processing unit, a microprocessor, a controller, a microcontroller, a digital signal processor, a field-programmable gate array, an application-specific integrated circuit, and/or another type of processing component. Processor 420 is implemented in hardware, firmware, or a combination of hardware and software. In some implementations, processor 420 includes one or more processors capable of being programmed to perform one or more operations or processes described elsewhere herein.

Memory 430 includes volatile and/or nonvolatile memory. For example, memory 430 may include random access memory (RAM), read only memory (ROM), a hard disk drive, and/or another type of memory (e.g., a flash memory, a magnetic memory, and/or an optical memory). Memory 430 may include internal memory (e.g., RAM, ROM, or a hard disk drive) and/or removable memory (e.g., removable via a universal serial bus connection). Memory 430 may be a non-transitory computer-readable medium. Memory 430 stores information, instructions, and/or software (e.g., one or more software applications) related to the operation of device 400. In some implementations, memory 430 includes one or more memories that are coupled to one or more processors (e.g., processor 420), such as via bus 410.

Input component 440 enables device 400 to receive input, such as user input and/or sensed input. For example, input component 440 may include a touch screen, a keyboard, a keypad, a mouse, a button, a microphone, a switch, a sensor, a global positioning system sensor, an accelerometer, a gyroscope, and/or an actuator. Output component 450 enables device 400 to provide output, such as via a display, a speaker, and/or a light-emitting diode. Communication component 460 enables device 400 to communicate with other devices via a wired connection and/or a wireless connection. For example, communication component 460 may include a receiver, a transmitter, a transceiver, a modem, a network interface card, and/or an antenna.

Device 400 may perform one or more operations or processes described herein. For example, a non-transitory computer-readable medium (e.g., memory 430) may store a set of instructions (e.g., one or more instructions or code) for execution by processor 420. Processor 420 may execute the set of instructions to perform one or more operations or processes described herein. In some implementations, execution of the set of instructions, by one or more processors 420, causes the one or more processors 420 and/or the device 400 to perform one or more operations or processes described herein. In some implementations, hardwired circuitry is used instead of or in combination with the instructions to perform one or more operations or processes described herein. Additionally, or alternatively, processor 420 may be configured to perform one or more operations or processes described herein. Thus, implementations described herein are not limited to any specific combination of hardware circuitry and software.

The number and arrangement of components shown in FIG. 4 are provided as an example. Device 400 may include additional components, fewer components, different components, or differently arranged components than those shown in FIG. 4. Additionally, or alternatively, a set of components (e.g., one or more components) of device 400 may perform one or more functions described as being performed by another set of components of device 400.

Figure 5:
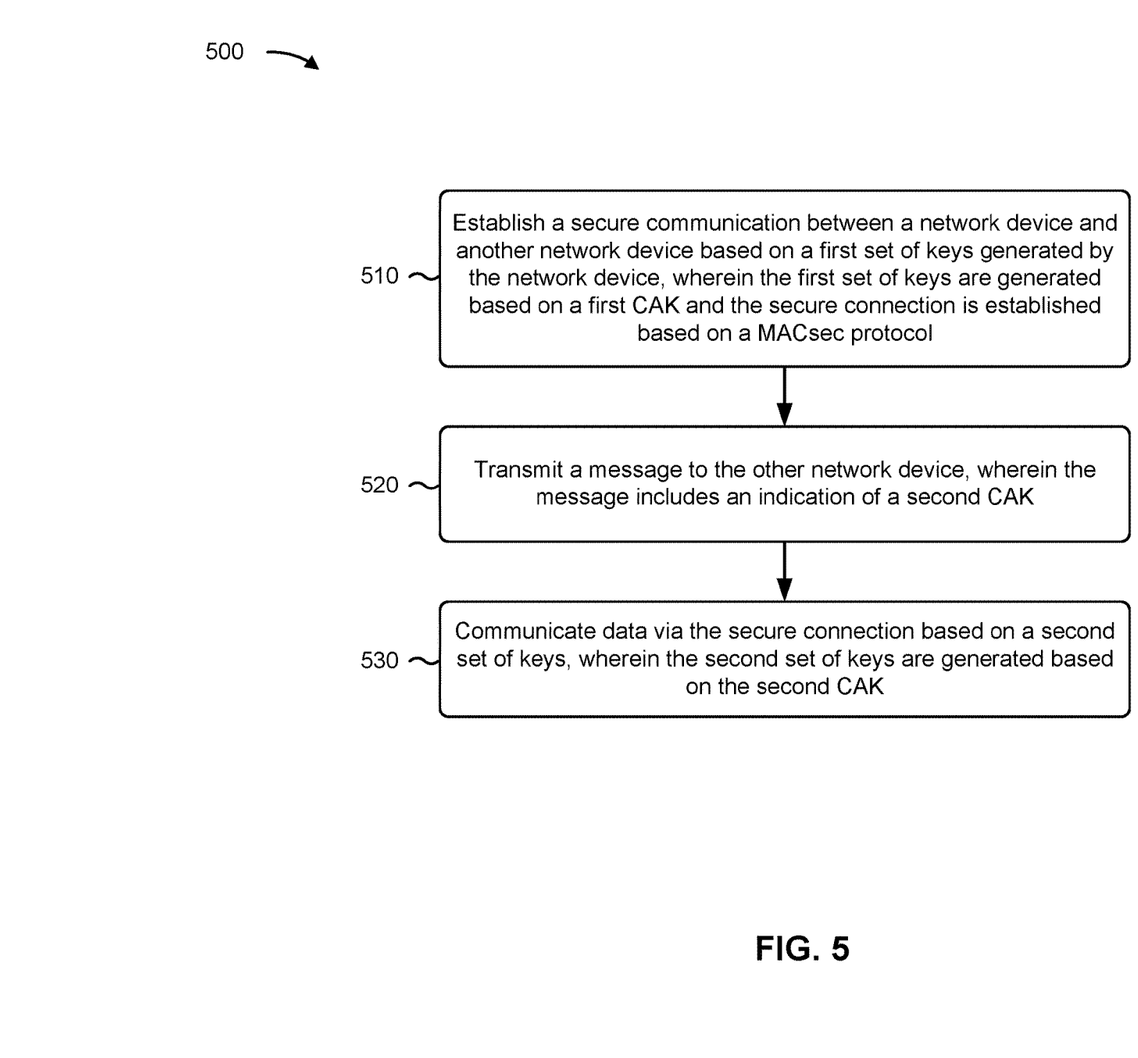
FIG. 5 is a flowchart of example processes relating to random connectivity association key negotiation for media access control security.

FIG. 5 is a flowchart of an example process 500 associated with systems and methods for random CAK negotiation for MACsec. In some implementations, one or more process blocks of FIG. 5 are performed by a network device (e.g., first device 105-1). In some implementations, one or more process blocks of FIG. 5 are performed by another device or a group of devices separate from or including the network device, such as another network device (e.g., second device 105-2). Additionally, or alternatively, one or more process blocks of FIG. 5 may be performed by one or more components of device 400, such as processor 420, memory 430, input component 440, output component 450, and/or communication component 460.

As shown in FIG. 5, process 500 may include establishing a secure connection between the network device and another network device based on a first set of keys generated by the network device, wherein the first set of keys are generated based on a first CAK and the secure connection is established based on a MACsec protocol (block 510). For example, the network device may establish a secure connection between the network device and another network device based on a first set of keys generated by the network device, wherein the first set of keys are generated based on a first CAK and the secure connection is established based on a MACsec protocol, as described above.

As further shown in FIG. 5, process 500 may include transmitting a message to the other network device, wherein the message includes an indication of a second CAK (block 520). For example, the network device may transmit a message to the other network device, wherein the message includes an indication of a second CAK, as described above.

As further shown in FIG. 5, process 500 may include communicating data via the secure connection based on a second set of keys, wherein the second set of keys are generated based on the second CAK (block 530). For example, the network device may communicate data via the secure connection based on a second set of keys, wherein the second set of keys are generated based on the second CAK, as described above.

Process 500 may include additional implementations, such as any single implementation or any combination of implementations described below and/or in connection with one or more other processes described elsewhere herein.

In a first implementation, the indication includes a pattern of data followed by an identifier associated with the second CAK.

In a second implementation, alone or in combination with the first implementation, the identifier associated with the second CAK includes one or more of a key identifier or a key name.

In a third implementation, alone or in combination with one or more of the first and second implementations, the indication further includes an identifier associated with the first CAK.

In a fourth implementation, alone or in combination with one or more of the first through third implementations, the pattern of data followed by the identifier associated with the second CAK is located at an end of the identifier associated with the first CAK.

In a fifth implementation, alone or in combination with one or more of the first through fourth implementations, process 500 includes receiving another message that includes information indicating a third CAK, obtaining the third CAK from a database storing a plurality of CAKs, generating a third set of keys based on the third CAK, and communicating additional data via the secure connection based on the third set of keys.

In a sixth implementation, alone or in combination with one or more of the first through fifth implementations, the message comprises a first message, the method further comprising transmitting a second message that includes information indicating a third CAK, receiving, based on transmitting the second message, a third message that includes information indicating the second CAK, and continuing, based on the third message including the information indicating the second CAK, to communicate via the secure connection based on the second set of keys.

Although FIG. 5 shows example blocks of process 500, in some implementations, process 500 includes additional blocks, fewer blocks, different blocks, or differently arranged blocks than those depicted in FIG. 5. Additionally, or alternatively, two or more of the blocks of process 500 may be performed in parallel.

The foregoing disclosure provides illustration and description, but is not intended to be exhaustive or to limit the implementations to the precise forms disclosed. Modifications and variations may be made in light of the above disclosure or may be acquired from practice of the implementations.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiple of the same item.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method, comprising:
   establishing, by a network device, a secure connection between the network device and another network device based on a first set of keys generated by the network device, wherein the first set of keys are generated based on a first connectivity association key (CAK) and the secure connection is established based on a media access control security (MACsec) protocol;
   transmitting, by the network device, a message to the other network device, wherein the message includes an indication of a second CAK,
   wherein the network device selects the second CAK from a first CAK database associated with the network device; and
   communicating, by the network device, data via the secure connection based on a second set of keys,
   wherein the second set of keys are generated based on the second CAK based on the other network device identifying the second CAK in a second CAK database associated with the other network device.

2. The method of claim 1, wherein the indication includes a pattern of data followed by an identifier associated with the second CAK.

3. The method of claim 2, wherein the identifier associated with the second CAK includes one or more of a key identifier or a key name.

4. The method of claim 2, wherein the indication further includes an identifier associated with the first CAK.

5. The method of claim 4, wherein the pattern of data followed by the identifier associated with the second CAK is located at an end of the identifier associated with the first CAK.

6. The method of claim 1, further comprising:
   receiving another message that includes information indicating a third CAK;
   obtaining the third CAK from a database storing a plurality of CAKs;
   generating a third set of keys based on the third CAK; and
   communicating additional data via the secure connection based on the third set of keys.

7. The method of claim 1, wherein the message comprises a first message, the method further comprising:
   transmitting a second message that includes information indicating a third CAK;
   receiving, based on transmitting the second message, a third message that includes information indicating the second CAK; and
   continuing, based on the third message including the information indicating the second CAK, to communicate via the secure connection based on the second set of keys.

8. A network device, comprising:
   one or more memories storing instructions; and
   one or more processors configured to execute the instructions to:
      establish a secure connection between the network device and another network device based on a first set of keys generated by the network device, wherein the first set of keys are generated based on a first connectivity association key (CAK) and the secure connection is established based on a media access control security (MACsec) protocol;
      transmit a message to the other network device, wherein the message includes an indication of a second CAK,
         wherein the network device selects the second CAK from a first CAK database associated with the network device; and
      communicate data via the secure connection based on a second set of keys,
         wherein the second set of keys are generated based on the second CAK based on the other network device identifying the second CAK in a second CAK database associated with the other network device.

9. The network device of claim 8, wherein the indication includes a pattern of data followed by an identifier associated with the second CAK.

10. The network device of claim 9, wherein the identifier associated with the second CAK includes one or more of a key identifier or a key name.

11. The network device of claim 8, wherein the indication includes an identifier associated with the first CAK and a pattern of data followed by an identifier associated with the second CAK.

12. The network device of claim 11, wherein the pattern of data followed by the identifier associated with the second CAK is located at an end of the identifier associated with the first CAK.

13. The network device of claim 8, wherein the one or more processors are further to:
receive another message that includes information indicating a third CAK;
obtain the third CAK from a database storing a plurality of CAKs;
generate a third set of keys based on the third CAK; and
communicate additional data via the secure connection based on the third set of keys.

14. The network device of claim 8, wherein the message comprises a first message, and wherein the one or more processors are further to:
transmit a second message that includes information indicating a third CAK;
receive, based on transmitting the second message, a third message that includes information indicating the second CAK; and
continue, based on the third message including the information indicating the second CAK, to communicate via the secure connection based on the second set of keys.

15. A non-transitory computer-readable medium storing a set of instructions, the set of instructions comprising:
one or more instructions that, when executed by one or more processors of a network device, cause the network device to:
establish a secure connection between the network device and another network device based on a first set of keys generated by the network device, wherein the first set of keys are generated based on a first connectivity association key (CAK) and the secure connection is established based on a media access control security (MACsec) protocol;
transmit a message to the other network device, wherein the message includes an indication of a second CAK,
wherein the network device selects the second CAK from a first CAK database associated with the network device; and
communicate data via the secure connection based on a second set of keys,
wherein the second set of keys are generated based on the second CAK based on the other network device identifying the second CAK in a second CAK database associated with the other network device.

16. The non-transitory computer-readable medium of claim 15, wherein the indication includes a pattern of data followed by an identifier associated with the second CAK.

17. The non-transitory computer-readable medium of claim 15, wherein the indication includes an identifier associated with the first CAK and a pattern of data followed by an identifier associated with the second CAK.

18. The non-transitory computer-readable medium of claim 17, wherein the pattern of data followed by the identifier associated with the second CAK is located at an end of the identifier associated with the first CAK.

19. The non-transitory computer-readable medium of claim 15, wherein the one or more instructions further cause the network device to:
receive another message that includes information indicating a third CAK;
obtain the third CAK from a database storing a plurality of CAKs;
generate a third set of keys based on the third CAK; and
communicate additional data via the secure connection based on the third set of keys.

20. The non-transitory computer-readable medium of claim 15, wherein the message comprises a first message, and wherein the one or more instructions further cause the network device to:
transmit a second message that includes information indicating a third CAK;
receive, based on transmitting the second message, a third message that includes information indicating the second CAK; and
continue, based on the third message including the information indicating the second CAK, to communicate via the secure connection based on the second set of keys.

* * * * *